United States Patent
Mirante et al.

(10) Patent No.: US 8,975,311 B2
(45) Date of Patent: Mar. 10, 2015

(54) RADIATION CURABLE COMPOSITE COATING COMPOSITION USEFUL TO FORM PROTECTIVE COATINGS

(75) Inventors: James V. Mirante, Archdale, NC (US); John F. Grunewalder, Greensboro, NC (US)

(73) Assignee: Valspar Sourcing, Inc., Minneapolis, MN (US)

( * ) Notice: Subject to any disclaimer, the term of this patent is extended or adjusted under 35 U.S.C. 154(b) by 146 days.

(21) Appl. No.: 13/312,186

(22) Filed: Dec. 6, 2011

(65) Prior Publication Data

US 2012/0142815 A1 Jun. 7, 2012

Related U.S. Application Data

(60) Provisional application No. 61/420,041, filed on Dec. 6, 2010.

(51) Int. Cl.
*C08J 9/32* (2006.01)
*C08L 33/14* (2006.01)
*C09D 7/00* (2006.01)
*C09D 175/14* (2006.01)

(52) U.S. Cl.
CPC .................. *C08L 33/14* (2013.01); *C09D 7/001* (2013.01); *C09D 175/14* (2013.01)
USPC ........... 523/218; 524/430; 524/492; 524/493; 524/589

(58) Field of Classification Search
USPC ............... 523/218; 524/430, 592, 493, 589
See application file for complete search history.

(56) References Cited

U.S. PATENT DOCUMENTS

| | | | |
|---|---|---|---|
| 4,011,195 A * | 3/1977 | Self | 523/505 |
| 5,543,232 A | 8/1996 | Ehrhart et al. | |
| 5,663,003 A | 9/1997 | Ehrhart et al. | |
| 5,773,487 A | 6/1998 | Sokol | |
| 5,830,937 A | 11/1998 | Shalov et al. | |
| 5,891,582 A | 4/1999 | Ehrhart et al. | |
| 5,907,382 A | 5/1999 | Kajiura et al. | |
| 6,426,034 B1 | 7/2002 | McComas et al. | |
| 6,436,540 B1 | 8/2002 | Garcia et al. | |
| 6,689,468 B2 | 2/2004 | Edelmann et al. | |
| 6,699,586 B2 | 3/2004 | Edelmann et al. | |
| 6,797,102 B2 | 9/2004 | Garcia et al. | |
| 6,800,353 B1 | 10/2004 | Anderson et al. | |
| 6,890,625 B2 | 5/2005 | Sigel et al. | |
| 7,005,472 B2 | 2/2006 | Anderson et al. | |
| 7,026,398 B2 | 4/2006 | Monkiewicz et al. | |
| 7,244,784 B2 | 7/2007 | Amick et al. | |
| 7,273,842 B1 | 9/2007 | VanDyk et al. | |
| 7,579,395 B2 | 8/2009 | Gottlieb | |
| 2002/0098243 A1 | 7/2002 | Edelmann et al. | |
| 2006/0079632 A1 | 4/2006 | Hofacker et al. | |
| 2007/0148435 A1 | 6/2007 | Meredith et al. | |
| 2007/0202343 A1 | 8/2007 | Sprenger et al. | |
| 2008/0057300 A1 | 3/2008 | Paiva et al. | |
| 2008/0226874 A1 | 9/2008 | Kalwa | |
| 2009/0047477 A1 | 2/2009 | Roys et al. | |
| 2009/0130489 A1 | 5/2009 | Stollwerck et al. | |

FOREIGN PATENT DOCUMENTS

| | | |
|---|---|---|
| CN | 1696225 | 11/2005 |
| EP | 1 728 834 | 12/2006 |
| WO | WO 90/07545 | 7/1990 |
| WO | WO 90/07575 | 7/1990 |
| WO | WO 02/077109 | 10/2002 |
| WO | WO 2005/049757 | 6/2005 |
| WO | WO 2007/006006 | 1/2007 |
| WO | WO 2009/120766 | 10/2009 |

OTHER PUBLICATIONS http://www.supmat.com/download/BASF/Inorganic%20Guide%20for%20Plastics.pdf.
Cabot Corporation, Nanogel Fine Particle Aerogel, "The Benefits of Utilizing Nanogel© Fine Particle Aerogels," 2004, pp. 1-2.
*USP Bulk Density and Tapped Density*, United States Pharmacopeia convention, Rockville, Md., 10$^{th}$ Supplement, 4950-4951, 1999.

* cited by examiner

*Primary Examiner* — Edward Cain

(57) ABSTRACT

A protective coating that comprises a free radically polymerizable component with an atypically high content of tri- or higher functional ingredients is disclosed. Diluents such as oligomeric resins in combination with other resins and particulate materials may also be employed in the composition.

10 Claims, No Drawings

RADIATION CURABLE COMPOSITE COATING COMPOSITION USEFUL TO FORM PROTECTIVE COATINGS

PRIORITY CLAIM

This application claims the benefit of U.S. Provisional Application Ser. No. 61/420,041, filed Dec. 6, 2010, entitled RADIATION CURABLE COMPOSITE COATING COMPOSITION USEFUL TO FORM PROTECTIVE COATINGS, the disclosure of which is incorporated herein by reference in its entirety for all purposes.

FIELD OF THE INVENTION

The present invention relates to free radically polymerizable coating compositions useful for forming protective coatings on a wide variety of substrates, and in particular to coating compositions that incorporate porous inorganic particles and at least one other kind of inorganic and/or organic particle.

BACKGROUND OF THE INVENTION

Protective coatings are used over a wide range of substrates to protect the substrate from abrasion, chemicals, stains, sunlight, weather, moisture, heat, cold, and other hazards. A typical protective coating may be derived from thermosetting compositions that are coated onto the desired substrate and then allowed or caused to cure to form the protective coating. One strategy formulates these coating compositions from one or more kinds of particles and other additives dispersed in a free radically polymerizable fluid. PCT Patent Publication WO 02/077109 is exemplifies such coatings.

In particular, protective coatings for engineered flooring materials are highly desired. The industry continues to search for coatings with even better abrasion resistance while still maintaining excellent toughness characteristics. Unfortunately, achieving higher levels of abrasion resistance often involves compromising toughness inasmuch as the chemistry that provides good abrasion resistance tends to reduce toughness unduly and vice versa. For instance, abrasion resistance can be improved by increasing crosslink density, but increasing crosslink density can make coatings more brittle than might be desired. An important industry objective is to search for strategies that would allow high levels of abrasion resistance and toughness to be achieved at the same time.

SUMMARY OF THE INVENTION

The present invention provides free radically polymerizable coating compositions that cure on demand to form cured protective coatings with exceptional abrasion resistance while maintaining a high level of toughness. The coating compositions can be used to protect a wide range of substrates, but are particularly useful for the protection of flooring products.

The principles of the present invention are based upon innovative formulation strategies that are advantageously practiced singly or in combinations. First, the coating compositions are based in one aspect upon the selection of free radically polymerizable ingredients with an atypically high content of tri- or higher functional ingredients. This helps to provide high crosslink density for abrasion resistance but then also is compatible with one or more other strategies that help to promote toughness. Second, the free radically polymerizable ingredients may include a combination of oligomeric diluent species as well as resins that help promote both toughness and crosslink density for excellent abrasion resistance. Preferred embodiments incorporate at least one tri or higher functional resin optionally in combination with one or more other resins to achieve these ends. Additionally, the free radically polymerizable ingredients provide a fluid carrier with rheological properties to support a large variety and amount of particulate components that are dispersed in the fluid carrier. Advantageously, these particles in preferred embodiments include a combination of porous particles and at least one other kind, of particle to help promote abrasion resistance, toughness, and desirable tactile feel.

Thus, in one embodiment, the present invention is directed to a coating composition that is derived from ingredients, comprising a free radically polymerizable component. The free radically polymerizable component includes a reactive diluent, wherein at least 15 weight percent of the reactive diluent is at least trifunctional with respect to radiation curable functionality based on the total weight of the reactive diluent. The free radically polymerizable component further includes one or more free radically polymerizable resins. The resins include at least a first free radically polymerizable resin having a Tg of 50° C. or greater, wherein the first resin is at least trifunctional with respect to radiation curable functionality. Optionally, a second free radically polymerizable resin is included that optionally may be at least trifunctional with respect to radiation curable functionality as well. In some embodiments, the second resin has a Tg less than about 50° C. The composition also includes at least one kind of porous inorganic particle is dispersed in the free radically polymerizable component. Such particle preferably has a surface area of at least about 400 m$^2$/g and an oil absorption number of at least 400 g/100 g. Preferred particle embodiments are in the form of aerogels.

In another embodiment, the present invention is directed to a coating composition that is derived from ingredients comprising: a radiation curable component; at least one kind of dispersed, porous inorganic particle such as aerogels and other particles having a surface area in the range from about 400 m$^2$/g to about 1000 m$^2$/g and an oil absorption number of at least 400 g/100 g; and at least one kind of dispersed, organic wax particle.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

This invention provides radiation curable compositions that can be applied to and cured on a wide variety of substrates to provide protective coatings with excellent scratch-resistance. Additives can be used in the compositions as desired to yield compositions and cured coatings with a wide variety of aesthetic, rheological, and texture characteristics. Exemplary substrates include natural and engineered flooring materials, walls, furniture, other building materials, motor vehicle components, aircraft components, marine components, machinery components, laminates, equipment components, computers, appliances, toys, packaging, lenses, windows, labels, decorative items, and the like. Substrate materials include wood, paper, engineered panels, boards, or the like derived from cellulosic materials, concrete, quartz or other ceramics, glass, metals, metal alloys, intermetallic compositions, natural or synthetic polymers, woven and nonwoven fabrics, combinations of these, microelectronic thin film structures, and the like. The coating compositions can be applied on new substrates or can be used to refurbish old substrates. In preferred modes of practice, the coating compositions are used to protect natural and engineered flooring.

Coating compositions of the present invention may be fluid to apply to substrates such as by brushing, spraying, spin coating, roll coating, curtain coating, dipping, gravure coating, and/or the like. Preferred embodiments of the coating compositions are in the form of fluid dispersions including one or more kinds of particle components dispersed in a fluid carrier.

Coating compositions of the present invention generally incorporate a free radically polymerizable component that includes at least one ingredient including free radically polymerizable functionality. Representative examples of free radically polymerizable functionality suitable in the practice of the present invention include (meth)acrylate groups, olefinic carbon-carbon double bonds, allyloxy groups, alpha-methyl styrene groups, (meth)acrylamide groups, cyanate ester groups, (meth)acrylonitrile groups, vinyl ethers groups, combinations of these, and the like. The term "(meth)acryl", as used herein, encompasses acryl and/or methacryl unless otherwise expressly stated. Acryl moieties are preferred relative to methacryl moieties in many instances, as acryl moieties tend to cure faster.

Prior to initiating curing, free radically polymerizable groups may provide compositions with relatively long shelf life that resist premature polymerization reactions in storage. At the time of use, polymerization can be initiated on demand with good control by using one or more suitable curing techniques. Illustrative curing techniques include but are not limited to exposure to thermal energy; exposure to one or more types of electromagnetic energy such as visible light, ultraviolet light, infrared light, or the like; exposure to acoustic energy; exposure to accelerated particles such as e-beam energy; contact with chemical curing agents such as by using peroxide initiation with styrene and/or a styrene mimetic; peroxide/amine chemistry; combinations of these; and the like. When curing of such functionality is initiated, crosslinking may proceed relatively rapidly so resultant coatings develop early green strength. Such curing typically proceeds substantially to completion under wide range of conditions to avoid undue levels of leftover reactivity.

In addition to free radically polymerizable functionality, the free radically polymerizable ingredient(s) incorporated into the free radically polymerizable component may include other kinds of functionality, including other types of curing functionality, functionality to promote particle dispersion, adhesion, scratch resistance, chemical resistance, abrasion resistance, combinations of these, and the like. For example, in addition to free radically polymerizable functionality, the free radically polymerizable ingredient(s) may also include additional crosslinkable functionality to allow the composition to form an interpenetrating polymer network upon being cured. One example of such other crosslinkable functionality includes OH and NCO groups, which are co-reactive to form urethane linkages. The reaction between OH and NCO often may be promoted by using a suitable crosslinking agent and catalyst. To help disperse particle additives, particularly ceramic particles, the ingredient(s) of the free radically polymerizable component may include pendant dispersant moieties such as acid or salt moieties of sulfonate, sulfate, phosphonate, phosphate, carboxylate, (meth)acrylonitrile, ammonium, quaternary ammonium, combinations of these, and the like. Other functionality can be selected to promote adhesion, gloss, hardness, chemical resistance, flexibility, and the like. Examples include epoxy, slime, siloxane, alkoxy, ester, amine, amide, urethane, polyester; combinations of these, and the like.

The one or more free radically polymerizable ingredients incorporated into the free radically polymerizable component may be aliphatic and/or aromatic. For outdoor applications, aliphatic materials tend to show better weatherability.

The one or more free radically polymerizable ingredients incorporated into the free radically polymerizable component may be linear, branched, cyclic, fused, combinations of these, or the like. For instance, branched resins may be preferred in some instances, as these resins may tend to have lower viscosity than linear counterparts of comparable molecular weight.

In those embodiments in which the coating compositions are fluid dispersions, the free radically polymerizable component may function as at least a portion of the fluid carrier for particulate ingredients of the compositions. More preferably, the coating compositions are as solvent-free as practical such that the radiation curable component functions as substantially the entirety of the fluid carrier. Some free radically polymerizable ingredients may, by themselves, exist as solids at room temperature, but tend to be readily soluble in one or more of the other ingredients used to provide the free radically polymerizable component. When cured, the resultant matrix serves as a binder for the other ingredients of the composition.

Illustrative embodiments of radiation curable components of the present invention desirably include a reactive diluent comprising one or more free radically polymerizable ingredients that have a weight average molecular weight under about 750, preferably in the range from about 50 to about 750, more preferably from about 50 to about 500. The reactive diluent functions as a diluent, as an agent to reduce the viscosity of the coating composition, as a coating binder/matrix when cured, as crosslinking agents, and/or the like.

The radiation curable component also optionally includes at least one free radically polymerizable resin in admixture with the reactive diluent. Generally, if the molecular weight of a resin is too large, the compositions may tend to be too viscous for easy handling. This also can impact the appearance of the resultant coating. On the other hand, if the molecular weight is too low, the toughness or resilience of the resultant compositions may suffer. It also can be more difficult to control film thickness, and the resultant coatings may tend to be more brittle than desired. Balancing these concerns, the term resin generally encompasses free radically polymerizable materials having a weight average molecular weight of about 750 or greater, preferably from about 750 to about 20,000, more preferably about 750 to about 10,000, even more preferably about 750 to about 5000, and most preferably about 750 to about 3000. Often, such one or more resins if solid by themselves at about room temperature are soluble in the reactive diluent so that the radiation curable component is a single, fluid phase. As used herein, molecular weight refers to weight average molecular weight unless otherwise expressly stated.

Desirably, the reactive diluent includes at least one ingredient that is mono functional with respect to free radically polymerizable functionality, at least one ingredient that is disfunctional with respect to free radically polymerizable functionality, and at least one ingredient that is trifunctional or higher functionality with respect to free radically polymerizable functionality. Reactive diluents including this combination of ingredients help to provide cured coatings with excellent abrasion resistance while maintaining high levels of toughness.

Representative examples of monofunctional, free radically polymerizable ingredients suitable for use in the reactive diluent include styrene, alpha-methylstyrene, substituted styrene, vinyl esters, vinyl ethers, lactams such as N-vinyl-2-pyrrolidone, (meth)acrylamide, N-substituted (meth)acrylamide, octyl(meth)acrylate, nonylphenol ethoxylate(meth) acrylate, isononyl(meth)acrylate, 1,6-hexanediol(meth) acrylate, isobornyl(meth)acrylate, 2-(2-ethoxyethoxy)ethyl (meth)acrylate, 2-ethylhexyl(meth)acrylate, lauryl(meth) acrylate, beta-carboxyethyl(meth)acrylate, isobutyl(meth) acrylate, cycloaliphatic epoxide, alpha-epoxide, 2-hydroxyethyl(meth)acrylate, (meth)acrylonitrile, maleic anhydride, itaconic acid, isodecyl(meth)acrylate, dodecyl (meth)acrylate, n-butyl(meth)acrylate, methyl(meth)acrylate, hexyl(meth)acrylate, (meth)acrylic acid, N-vinylcaprolactam, stearyl(meth)acrylate, hydroxy functional caprolactone ester(meth)acrylate, octodecyl(meth)acrylate, isooctyl(meth)acrylate, hydroxyethyl(meth)acrylate, hydroxymethyl(meth)acrylate, hydroxypropyl(meth)acrylate, hydroxyisopropyl(meth)acrylate, hydroxybutyl(meth) acrylate, hydroxyisobutyl(meth)acrylate, tetrahydrofurfuryl (meth)acrylate, combinations of these, and the like. If one or more of such monofunctional monomers are present, these may comprise from 0.5 to about 50, preferably 0.5 to 35, and more preferably from about 0.5 to about 25 weight percent of the radiation curable component based on the total weight of the free radically polymerizable component.

In some embodiments, a monofunctional component of the reactive diluent includes a lactam having pendant free radically polymerizable functionality and at least one other ingredient that is monofunctional with respect to free radical polymerizability. Preferably, at least one of such additional monofunctional ingredients has a weight average molecular weight in the range of from about 50 to about 500. The weight ratio of the lactam to the one or more other monofunctional ingredients desirably is in the range from about 1:50 to 50:1, preferably 1:20 to 20:1, more preferably about 2:3 to about 3:2. In one illustrative embodiment, using N-vinyl-2-pyrrolidone and octodecylacrylate at a weight ratio of about 1:1 would provide a suitable monofunctional component of the reactive diluent.

The di, tri, and/or higher functional constituents of the reactive diluent help to enhance one or more properties of the cured composition, including crosslink density, hardness, abrasion resistance, chemical resistance, scratch resistance, or the like. In many embodiments, these constituents may comprise from 0.5 to about 50, preferably 0.5 to 35, and more preferably from about 0.5 to about 25 weight percent of the free radically polymerizable component based on the total weight of the free radically polymerizable component. Examples of such higher functional, radiation curable monomers include ethylene glycol di(meth)acrylate, hexanediol di(meth)acrylate, triethylene glycol di(meth)acrylate, tetraethylene glycol di(meth)acrylate, trimethylolpropane tri (meth)acrylate (TMPTA), ethoxylated trimethylolpropane tri (meth)acrylate, glycerol tri(meth)acrylate, pentaerythritol tri (meth)acrylate, pentaerythritol tetra(meth)acrylate, and neopentyl glycol di(meth)acrylate, 1,6 hexanediol di(meth) acrylate, dipentaerythritol penta(meth)acrylate, combinations of these, and the like. Additional free radically polymerizable monomers that would be suitable in the practice of the present invention include those described in PCT Publication No. WO 02/077109.

In many embodiments, it is desirable if the reactive diluent includes at least one trifunctional or higher functionality material having a molecular weight in the range from about 50 to about 500 to promote abrasion resistance. The amount of such trifunctional or higher functionality materials used in the reactive diluent may vary over a wide range. In many desirable embodiments, at least about 15 weight percent, preferably at least about 20 weight percent, at least about 25 weight percent, and even at least 45 weight percent of the reactive diluent is at least trifunctional or higher with respect to free radically polymerizable functionality based upon the total weight of the reactive diluent. These desirable embodiments incorporate an atypically high amount of tri- or higher functionality for increased crosslink density and corresponding high hardness and scratch resistance, but yet show excellent toughness.

Generally, one would expect that using so much crosslink density would obtain high hardness and scratch resistance at too much expense in terms of toughness and/or resilience. The conventional expectation would be that the resultant compositions to be too brittle to be practical. However, the present invention is able to incorporate a relatively large content of tri- or higher functionality in the reactive diluent while still maintaining very good levels of toughness and resilience. As discussed below, in some embodiments the diluent materials may be combined along with performance enhancing free radically polymerizable resins, and various selected particles, including ceramic particles, organic particles, certain other additives, and combinations thereof.

The resultant free radically polymerizable components also have rheological properties to support relatively substantial particle distributions. This means that the free radically polymerizable component can be loaded to very high levels with particles and other additives that help to promote desirable characteristics such as scratch resistance, toughness, durability, and the like. In many embodiments, the composite mixture of the free radically polymerizable materials and the particle components may have pseudoplastic and thixotropic properties to help control and promote smoothness, uniformity, aesthetics, and durability of the resultant cured compositions. In particular, the desirable thixotropic properties help reduce particle settling after application. In other words, the free radically polymerizable component provides a carrier in which the particle distribution remains very stable during storage and after being applied onto a substrate. This stability includes helping to maintain particles at the composition surface to a large extent after application to a substrate. By maintaining particle populations at the surface, high scratch resistance at the surface is maintained.

In some embodiments, at least one of the constituents of the reactive diluent optionally includes epoxy functionality in addition to free radically polymerizable functionality. In an illustrative embodiment, a diacrylate ingredient with a weight average molecular weight of about 500 to 700 and including at least one backbone moiety derived from epoxy functionality is incorporated into the reactive diluent. One example of such a material is commercially available under the trade designation CN120 from Sartomer Co., Inc. A blend containing 80 parts by weight of this oligomer with 20 parts by weight of TMPTA is also available from this source under the trade designation CN120C80. In some embodiments, using from about 1 to about 25, preferably about 8 to 20 parts by weight of this oligomer per about 1 to about 50 parts by weight, preferably 5 to 20 parts by weight of the monofunctional constituents of the reactive diluent would be suitable. In an exemplary embodiment, using about 15 to 16 parts by weight of the CN120-80 admixture per about 12 parts by weight of monofunctional ingredients would be suitable.

In addition to the reactive diluent, a free radically polymerizable component may include one or more free radically polymerizable resins. When the free radically polymerizable component includes one or more free radically polymerizable resins, the amount of such resins incorporated into the compositions of the present invention may vary over a wide range. As general guidelines the weight ratio of the free radically polymerizable resin(s) to the reactive diluent often may be in the range from about 1:20 to about 20:1, preferably 1:20 to 1:1, more preferably 1:4 to 1:1, and even more preferably about 1:2 to 1:1.

In illustrative embodiments, the free radically polymerizable resin component desirably includes one or more resins such as (meth)acrylated urethanes (i.e., urethane(meth)acrylates), (meth)acrylated epoxies (i.e., epoxy(meth)acrylates), (meth)acrylated polyesters (i.e., polyester(meth)acrylates), (meth)acrylated(meth)acrylics, (meth)acrylated silicones, (meth)acrylated amines, (meth)acrylated amides; (meth) acrylated polysulfones; (meth)acrylated polyesters, (meth) acrylated polyethers (i.e., polyether (meth)acrylates), vinyl (meth)acrylates, and (meth)acrylated oils. In the practice of the present invention, referring to a resin by its class (e.g., polyurethane, polyester, silicone, etc.) means that the resin includes at least one moiety characteristic of that class even if the resin includes moieties from another class. Thus, a polyurethane resin according to the practice of the present invention includes at least one urethane linkage but also might include one or more other kinds of polymer linkages as well.

Representative examples of free radically polymerizable resin materials include radiation curable (meth)acrylates, urethanes and urethane(meth)acrylates (including aliphatic polyester urethane(meth)acrylates) such as the materials described in U.S. Pat. Nos. 5,453,451, 5,773,487 and 5,830, 937. Additional free radically polymerizable resins that would be suitable in the practice of the present invention include those described in PCT Publication No. WO 02/077109. A wide range of such materials are commercially available.

Preferred embodiments of the resin component include at least a first free radically polymerizable polyurethane resin that has a glass transition temperature (Tg) of at least 50° C. and is at least trifunctional, more preferably at least tetrafunctional, more preferably at least pentafunctional, and even more preferably at least hexafunctional with respect to free radically polymerizable functionality. This first resin desirably has a Tg of at least about 60° C., more preferably at least about 80° C., and even more preferably at least about 100° C. In one mode of practice, a free radically polymerizable urethane resin having a Tg of about 50° C. to 60° C., and that is hexavalent with respect to (meth)acrylate functional would be suitable. An exemplary embodiment of such a hexafunctional resin is commercially available under the trade designation Genomer 4622 from Rahn.

In some embodiments, the first resin is used in combination with one or more other kinds of resins. Optionally, at least one of such other resins is also free radically polymerizable. For example, some embodiments incorporate the first resin in combination with at least a second free radically polymerizable resin that can be mono or multifunctional with respect to free radically polymerizable moieties. If present, the second free radically polymerizable resin can have a Tg over a wide range, such as from −30° C. to 120° C. In some embodiments, the second resin has a Tg of less than 50° C., preferably less than about 30° C., and even less than about 10° C. Many embodiments of the second resin are polyurethane materials. An exemplary embodiment of such a resin is commercially available under the trade designation Desmolux U500 (formerly Desmolux XP2614) from Bayer MaterialScience AG.

Resins can be selected to achieve desired gloss objectives. For example, formulating a composition with a first free radically polymerizable resin having a relatively high Tg over about 50° C. in combination with an optional second free radically polymerizable resin having a relatively low Tg, such as below about 30° C., is helpful to provide coatings with mid-range gloss (e.g., about 50 to about 70) or high-range gloss (greater than about 70). Formulating with only one or more free radically polymerizable resins having a relatively higher Tg tends to be helpful to provide coatings with lower gloss (e.g., below about 50).

The weight ratio of the first and second resins may vary over a wide range. To provide coatings with excellent abrasion resistance and toughness with respect to embodiments in which the Tg of the second resin is under about 50° C., it is desirable if the ratio of the second, lower Tg resin to the first, higher Tg resin is in the range from about 1:20 to 20:1, preferably less than 1:1, such as in the range from about 1:20 to about 1:1, more preferably about 1:20 to about 4:5, or even more preferably about 1:20 to about 1:3. In one illustrative embodiment, a weight ratio of about 9:1 would be suitable.

An exemplary embodiment of a free radically polymerizable component comprising a reactive diluent with an atypically high content of trifunctional or higher functionality includes from about 1 to about 10, preferably about 4 to about 8 parts by weight of a lactam such as N-vinyl-2-pyrrolidone, about 1 to about 10, preferably about 2 to about 8 parts by weight of another monofunctional material having a molecular weight under about 500 such as octodecyl acrylate, about 5 to about 25, preferably about 7 to about 30 parts by weight of a difunctional reactive diluent such as 1,6-hexane diacrylate; about 1 to about 8, preferably about 2 to 5 parts by weight of a trifunctional reactive diluent having a molecular weight under about 500 such as trimethylol propane triacrylate TMPTA, about 1 to about 20 parts by weight of a trifunctional oligomer having a molecular weight in the range from about 500 to about 2000, about 1 to about 40 parts by weight of a difunctional oligomer having epoxy functionality and a molecular weight in the range from about 500 to about 2000, about 1 to about 15 parts by weight of the first resin, and about 1 to about 15 parts by weight of the second resin.

Compositions of the present invention may be formulated so as to meet one or more specific objectives such as to be compatible with a particular curing strategy, to improve product performance, or to improve product appearance. For example, some manufacturing processes may use UV curing lamps of relatively high intensity and/or that are highly focused. In such cases, it may be advantageous to formulate the reactive diluent to comprises a higher proportion of oligomers that are tri- or higher in functionality, and then these desirably are used in combination with one or more other monomers. Examples of such other monomers include N-vinyl-2-pyrrolidone, octodecyl(meth)acrylate, and combinations thereof. Cured coatings prepared by such curing demonstrate reduced "shine-up". Shine-up results when boxes containing substrates having the cured coating rub against each other during shipping and handling. Additionally, this curing technique allows the use of a single porous inorganic particle of the type discussed below, thereby simplifying the formulation.

Compositions of the present invention desirably incorporate at least one kind of porous, inorganic particle having a surface area of at least about 400 m2/g, preferably in the range from about 400 $m^2$/g to about 1500 $m^2$/g and an oil absorption number of at least 400 g/100 g. Even though porous, it has been discovered that these particles, particularly when used in combination with at least one of the free radically polymerizable resin component described herein, other inorganic particles, and/or other organic particles provides cured coating compositions with dramatically improved scratch resistance while maintaining excellent toughness characteristics. For example, an embodiment of the present invention incorporating porous inorganic particles in combination with a free radically polymerizable component described herein, porous aerogel particles, silica particles, alumina particles, and fluoropolymer particles was tested for scratch resistance and compared to two comparison control panels, each of which was a commercially available hardwood floor product with a factory applied, uv-curable coating. The samples were rubbed with 7447B Red Scotch Brite™ (3M Company) Pads with 11.78 pounds of down pressure. The sample of the present invention handled 3000 double rubs with no scratching. In contrast, the other two samples showed scratches after only 10 cycles.

Oil absorption number (OAN) refers to the grams of linseed oil absorbed per 100 g of the particles being evaluated according to the designated test procedure. To determine OAN, a suitable sample size is obtained, weighed, and placed upon a glass plate or marble slab. Generally, the sample size is in the range from about 2 g to about 25 g, often about 10 g to about 15 g. In the meantime, a vessel containing raw linseed oil and a glass pipe tube are weighed. The pipet tube is used to add linseed oil to the sample drop by drop. After each addition, the oil and particles are thoroughly mixed by rubbing with a spatula or other suitable mixing tool. Oil is added until just enough oil is incorporated into the pigment to produce a stiff paste that does not break or separate. The paste should be able to be gently rolled without separation at this endpoint. The bottle and pipet tube are weighed. The OAN is given by the expression $$OAN=100\times((B-C)/A)$$

wherein A=Wt. of the test sample, B=Initial wt. of the bottle with linseed oil, C=Wt. of the bottle with linseed oil after the test. The final OAN reported will be the average of three values.

Specific surface area (SSA) refers to the surface area of particles per unit mass. The SSA is measured by adsorption using the BET isotherm method.

Porosity typically is present in the form of one or more of micropores, mesopores, and/or macropores. The International Union of Pure and Applied Chemistry promulgates a classification for porous materials where pores of less than 2 nm in diameter are termed "micropores", those with diameters between 2 and 50 nm are termed "mesopores", and those greater than 50 nm in diameter are termed "macropores". Preferred porous particles of the present invention include all three kinds of porosity, although one kind of porosity, e.g., mesopores for instance, might predominate.

Theoretically, porosity is a measure of the void spaces in a material and is the fraction of voids with respect to the total volume, often expressed as a percentage;

$$P=V_V/V_T\times100\%\qquad(1)$$

wherein P is porosity, $V_V$ is the volume of void space, and $V_T$ is the total bulk volume of the material.

In practice however, and except in the case of aerogel particles as discussed below, porosity is more conveniently calculated from the bulk and particle densities according to $$P=(1-(p_b-p_p))\times100\%\qquad(2)$$

wherein P is porosity, $p_b$ is bulk density, and $p_p$ is particle density. Particle density refers to the true density of a particulate and is the density of the particles that make of the powder in contrast to bulk density, which measures the average density of a large volume of powder in air. Particle density tends to be a well-defined quantity, as it is independent of the degree of compaction. In contrast, bulk density could have different values depending upon degree of compaction. In the practice of the invention, the bulk density is determined as the weight in grams of an uncompacted pigment that occupies a volume of 1 cm³ according to the DIN ISO 171 method. The density of a pigment is determined by a pycnometer according to the DIN EN ISO 787-10 method. Density determinations are further referenced in the guide publication titled Inorganic Pigments for Plastics (2008) that is published by BASF Corporation, 100 Campus Drive, Florham Park, N.J. 07932. A copy of this publication is currently available online at http://www.supmat.com/download/BASF/Inorganic%20Guide%20for%20Plasties.pdf A particle will be deemed to be porous if the porosity determined according to equation 2 is 20% or greater, preferably 50% or greater, more preferably 70% or greater.

Preferably, the porous particles comprise aerogel particles. An aerogel particle refers to a particle derived from a gel in which a major portion, and preferably at least substantially all of the liquid in the gel is replaced with a gas. Aerogel particles are highly porous, very low density solids. Aerogel particles can be so porous that they have been referred to as "frozen smoke". Although porous, the actual porosity can be difficult to measure inasmuch as many analytic techniques are unable to characterize aerogel particles correctly. Accordingly, aerogel particles having a specific surface area of at least 400 m2/g, preferably in the range from about 500 m2/g to about 1000 m2/g, preferably about 600 m2/g to about 800 m2/g, and having one or both of (a) an oil absorption number of at least about 400 g/100 g, preferably in the range from about 400 g/100 g to about 700 g/100 g; and/or (b) a density of less than about 300 mg/cm3, preferably less than about 100 mg/cm3, and even less than about 50 mg/cm3 shall be deemed to be porous for purposes of the present invention. Some aerogels have even been reported to have a density on the order of about 1 mg/cm3 to about 1.9 mg/cm3. For comparison, air at sea level has a density on the order of about 1.2 mg/cm3.

Aerogel particles tend to include micropores, mesopores, and macropores although it is believed that a majority of the porosity has a size in the range of about 20 nm to about 40 nm. It is also believed that much of the porosity is interconnected and hence "open" rather than being isolated, or "closed."

Many aerogel particles have a D50 particle size in the range from about 0.1 micrometer to about 4 mm. Many aerogel particles tend to have low tap density such as a tap density in the range from about 30 kg/m3 to about 100 kg/m3. Tap density can be determined using the method of *USP Bulk Density and Tapped Density*, United States Pharmacopoeia convention, Rockville, Md., 10$^{th}$ Supplement, 4950-4951, 1999. Instruments for measuring tap density, known to those skilled in the art, include but are not limited to the Dual Platform Microprocessor Controlled Tap Density Tester (Vankel, N.C.) or a GeoPyc instrument (Micrometrics Instrument Corp., Norcross, Ga. 30093).

Aerogel particles can be silica, alumina, chromia, tin oxide, carbon, chalcogen-based, agar-based, combinations of these, and the like. Silica aerogel particles are generally preferred as these have excellent properties and are commercially available. One example of a suitable silica aerogel particle is commercially available under the trade designation "NANOGEL" from Cabot Nanogel GmbH. The vendor reports that one aerogel available under the trade designation NANOGEL OGD201 has over 95% porosity.

The amount of porous, inorganic particles used in the coating compositions may vary over a wide range. As general guidelines, compositions of the invention may include from about 0.01 to about 5 parts by weight, preferably 0.1 to about 1 part by weight, more preferably about 0.01 to about 0.5 parts by weight of porous particles per 20 to 100 parts by weight of the free radically polymerizable component.

In addition to the porous particles, many embodiments of the coating compositions may include one or more additional kinds of organic and/or inorganic particles. As one example, wax particles may be beneficially incorporated into the compositions. It has been determined that using such particles helps to improve abrasion resistance. These can also improve the feel of the resultant cured coating and/or lower the coefficient of friction. When incorporated into the coating compositions, it is believed that a substantial portion of the wax particles migrate to the surface of the coating and generally remain proximal to the surface when the composition is cured.

A variety of wax particles may be used. Examples include particles incorporated partially fluorinated and/or fluorinated hydrocarbons, polyolefins such as polyethylene or polypropylene, combinations of these, and the like. Wax particles comprising polytetrafluoroethylene (PTFE) are suitable. Blends of PTFE particles and polyethylene (PE) particles also would be suitable. If blends are used, the weight ratio of PE particles to PTFE particles may vary over a wide range. In some embodiments, this ratio is in the range from about 1:20 to 20:1. A weight ratio of PE to PTFE particles of 70:30 would be suitable, for instance. Wax particles comprising polytetrafluoroethylene are commercially available from a number of commercial suppliers such as under the trade designation Perflu 727 FS from G.E. Chaplin Inc. Other vendors of such particles include Shamrock Technologies (Newark, N.J.) and Micro Powders, Inc. (Tarrytown, N.Y.).

The particle size of the wax particles may vary over a wide range. If these particles are too large, the surface of the resultant cured coating my not be as smooth as might be desired. If too small, the clarity of the coating could be reduced. Balancing such concerns, using wax particles having a $D_{50}$ size in the range from about 2 micrometers to about 20 micrometers would be suitable in illustrative embodiments. The wax particles may have wide range of shapes. Illustrative shapes include spherical, rectangular, pyramidal, generally rounded, acicular, dendritic, or the like. Wax particles with an irregular shape. help to provide good friction properties.

In addition to the inorganic, porous particles and the optional wax particles (if any), coating compositions optionally may include at least one kind of additional, dispersed, inorganic and/or organic particles. Preferably, the additional, dispersed, particles have an oil absorption number less than 400 g/100 g and have a $D_{50}$ size in the range from about 0.05 micrometers to about 50 micrometers. In illustrative embodiments, these may be diamond, polymeric, ceramic, or composites of these. Ceramic particles in many embodiments may be oxides, nitrides, carbides, or combinations of these. The additional particles may have a variety of regular or irregular shapes. Some may be in the form of beads such as zeolite beads, polymeric beads, or the like.

Desirably, the additional particles include at least one kind of silica particle. Silica particles can be selected to enhance a wide variety of coating characteristics, including thixotropy, sheen, smoothness, scratch resistance, and the like. Illustrative silica particles generally are characterized by a D50 particle size in the range from about 1 to about 15 micrometers, preferably about 3 to about 10 micrometers; a mean particle size in the range from about 0.5 to about 20 micrometers, preferably about 1 micrometer to about 5 micrometers; and an oil absorption number in the range from about 150 g/100 g to about 380 g/100 g. One example of a suitable silica particle is commercially available under the trade designation OK520 from Evonik Industries (formerly Degussa). This silica particle has an OAN of 270 g/100 g, a D50 size of 6.5 micrometers, and a mean particle size of 3 micrometers. This silica is an excellent matting agent. Another example of a suitable silica particle is commercially available under the trade designation OK412 from Evonik Industries. This silica particle has an OAN of 220 g/100 g, a D50 size of 6.0 micrometers, and a mean particle size of 3 micrometers. Silicas are used to help control matting and gloss, as the case may be.

In more preferred embodiments, a combination of at least two kinds of silica particles having these characteristics is used wherein the first kind of silica particle has an oil absorption number that is at least about 20 g/100 g, more preferably at least about 40 g/100 g greater than the second kind of silica particle. The weight ratio of the two kinds of silica particles may vary over a wide range. In illustrative embodiments the weight ratio of the first to second silica particles is in the range from about 1:20 to about 20:1, preferably about 1:5 to about 5:1, more preferably about 2:3 to about 3:2. According to a preferred embodiment, the OK520 particles provide the first silica particles, and the OK412 particles provide the second kind of silica particles.

Other kinds of additional particles that may be used include hard inorganic particles having a Mohs hardness greater than about 4, more preferably greater than about 6, more preferably greater than about 7. Such particles can be used to enhance scratch resistance with good toughness. Exemplary embodiments of such particles include diamond, nitrides, carbides, and oxides such as alumina, zeolites, combinations of these, and the like. Alumina is presently preferred.

Exemplary hard inorganic particles may have a wide range of particle sizes. In exemplary embodiments, such particles have a $D_{50}$ particle size in the range from about 1 to about 25 micrometers, preferably about 5 to about 14 micrometers. Exemplary hard particles have a grit in the range from about 600 to about 1200 grit and are available from many commercial sources. These particles desirably have a 1350 size in the range of from about 5.5 to about 7.5 micrometers, about 94% of the particles have a particle size over 2 micrometers, and 3% of the particles have a particle size over about 14 micrometers.

Coating compositions may include one or more additives such as one or more photoinitiators, dispersants, flow control agents, anti-foaming agents, viscosity reducers, colorants, antistatic agents, uv protection agents, slip modifiers, thixotropic agents, plasticizers, waxes, oils, antioxidants, stabilizers, gloss agents, fungicides, bactericides, fillers, leveling agents, combinations of these and the like.

Coating compositions of the present invention can be made in a variety of ways. According to one representative methodology, the ingredients of the radiation curable component are combined and mixed until homogeneous. These can be added together all at once or added in a desired sequence. For instance, the lower molecular weight materials can be combined initially to form a reactive diluent. The higher molecular weight materials can then be added more easily. Mixing desirably occurs at relatively low rpm. In some modes of practice, mixing at about 500 rpm for a suitable time period would be effective.

Next, the desired additional ingredients can be incorporated into the admixture. This can occur singly, in groups, or all at one time. It is often convenient to add these additional ingredients singly or in groups to help ensure homogeneous mixing. For instance, desired additives can be incorporated into the admixture next. Incorporating the desired organic and/or inorganic particles into the admixture can follow this.

The coating composition can be formed under ambient conditions or in a protected atmosphere such as in argon, nitrogen, carbon dioxide, clean dry air, or the like. Forming the admixture under ambient conditions has been found to be suitable.

It is desirable to mix the ingredients under conditions that avoid generating too much heat. For instance, keeping the temperature of the admixture under about 120 F (49° C.) during mixture has been suitable. This can be accomplished by mixing at relatively low rpm, by cooling the admixture during mixing, or the like. Adding ingredients to the vortex of the of the mixing vessel assists with introducing the additional ingredients into the admixture.

The resultant coating composition is very stable and has a long shelf life. Accordingly, the coating composition can be placed into suitable storage containers and stored prior to use. Alternatively, the coating composition can be used promptly after mixing to form protective coatings on the desired substrates.

The coating compositions of the present invention may be applied to substrates in any suitable fashion. Representative examples of application techniques include screen printing, roll coating, spraying, ink jetting, extrusion die coating, flexographic printing, offset printing, knife coating, spin coating, curtain coating, brushing, pouring, and the like.

After being coating, the compositions may be cured by using a suitable amount and type of curing energy. Exemplary curing energies include thermal energy, electron beam energy, ultraviolet energy, combinations of these, and the like. Other objects, features, and advantages of this invention are further illustrated by the following examples, but the particular materials and amounts thereof recited in these examples, as well as other conditions and details, should not be construed to unduly limit this invention.

Example 1

General Procedure

A radiation curable component is prepared in two steps. First, predetermined weights of the radiation curable components are combined and mixed until homogeneous. Next, a predetermined weight of a low Tg, aromatic polyurethane acrylate resin and a predetermined weight of a high Tg, urethane acrylate resin are added to the admixture. Mixing continues for another 5 to 10 minutes until homogeneous.

Flow additives, anti-settling additives, photoinitiator(s), and dispersing additives are then are then added singly with mixing until homogeneous. After incorporating the additives, the aluminum oxide particles, silica particles, aerogel particles and wax particles are added singly with mixing until homogeneous: The particles are added to the vortex of the admixture. Keeping the temperature of the admixture below 120 F, the rpm is increased as needed to assist with particle dispersion.

Examples 2-11

The general procedure of Example 1 was used to prepare the formulations in Table 1. All concentration values for the individual ingredients are given in parts by weight. The identity of the individual ingredients in Table 1 is set out in Table 2. All examples when properly applied and cured will show a scratch resistance of 8 (1-10 scale with 10 being zero scratches) using a 7447B Red Scotch Brite™ pad as described above. Commercially available residential flooring obtained for comparison showed a scratch resistance of 2-3 in the same test.

TABLE 1

Topcoat formulations

| Raw Material (below): | Sample (across): | | | | | | | | | |
|---|---|---|---|---|---|---|---|---|---|---|
| | 2 Low Gloss | 3 Low Gloss | 4 Low Gloss | 5 Low Gloss | 6 Low Gloss | 7 Mid-Gloss | 8 Mid-Gloss | 9 Mid-Gloss | 10 Mid-Gloss | 11 High Gloss |
| Mono-functional diluent1 | 6.1 | 5.7 | 2 | 2 | 4.7 | 0 | 0 | 0 | 0 | 0 |
| Mono-functional diluent 2 | 6.1 | 5.7 | 0 | 0 | 4.7 | 0 | 0 | 0 | 0 | 0 |
| Mono-functional diluent 3 | 0 | 0 | 0 | 3 | 0 | 0 | 0 | 0 | | |
| Di-functional diluent 1 | 18.4 | 18 | 27 | 26 | 19 | 17.7 | 9.5 | 10.5 | 13 | 7.5 |
| Di-functional diluent 2 | | | | | | | | 10.4 | | |
| ≥3 Functional reactive diluent 1 | 10.7 | 10.1 | 13 | 12 | 12 | 18.6 | 21.7 | 0 | 24 | 27 |
| ≥3 Functional reactive diluent 2 | | | | | | | | 19.7 | | |
| ≥3 Functional reactive diluent 3 | | 5.7 | | | | | | 5.2 | | |
| Hexa-functional Oligomer 1 | 2 | 1 | 12 | 13 | 5.3 | 21.9 | 20 | 0 | 23 | 23.7 |
| Hexa-functional Oligomer 2 | | | | | | | | 19 | | |
| Di-functional Epoxy Oligomer | 15 | 14 | 8.3 | 7.2 | 10.3 | 12.4 | 0 | 7.8 | 9.8 | 18.7 |
| Di-functional Urethane Acrylate 1 | 9 | 8.4 | 1.7 | 1.4 | 6.8 | 0 | 0 | 0 | 0 | 0 |
| Di-functional Urethane Acrylate 2 | | | | | 6.7 | | | | | |

TABLE 1-continued

Topcoat formulations

| Raw Material (below): | 2 Low Gloss | 3 Low Gloss | 4 Low Gloss | 5 Low Gloss | 6 Low Gloss | 7 Mid-Gloss | 8 Mid-Gloss | 9 Mid-Gloss | 10 Mid-Gloss | 11 High Gloss |
|---|---|---|---|---|---|---|---|---|---|---|
| Di-functional Urethane Acrylate 3 | | | | | | | 6.3 | | | |
| Flow Additive 1 | 0.1 | 0.1 | 0.5 | 0.4 | 0.2 | 0.6 | 0.1 | 0.2 | 0.2 | 0.4 |
| Flow Additive 2 | | | | | | | 0.3 | | | |
| Flow Additive 3 | | 0.3 | | | | | | | | |
| Anti-Settle Additive | 0 | 0 | 0 | 0 | 0 | 0.5 | 0.3 | 0.4 | 0.5 | 0.4 |
| Photoinitiator 1 | 2.8 | 0 | 3.9 | 3.7 | 0 | 3.8 | 3.6 | 3.7 | 3.8 | 4.5 |
| Photoinitiator 2 | | 2.6 | | | 2.6 | | | | | |
| Dispersing Additive 1 | 2.9 | 2.7 | 3.6 | 3.2 | 3.2 | 2.4 | 1.3 | 0 | 1.5 | 0.4 |
| Dispersing Additive 2 | | | | | | | | 1.2 | | |
| Slip Aid | 0 | | 0 | 0 | 0 | 0 | 0.3 | 0 | 0 | |
| Aluminum Oxide 1 | 14.4 | 13.5 | 13.8 | 15 | 13 | 13.7 | 0 | 13.5 | 16 | 14.7 |
| Aluminum Oxide 2 | | 0.5 | | 0 | 0.5 | | 4 | 0 | | |
| Aluminum Oxide 3 | | | | | | | 26.2 | | | |
| Flatting Silica 1 | 8.7 | 8.1 | 6.4 | 5.6 | 7.8 | 5.9 | 1.8 | 0 | | 1 |
| Flatting Silica 2 | | | 3.6 | 3.2 | | | 1.8 | 0 | | |
| Flatting Silica 3 | | | | | | | | 5.2 | 4.5 | |
| Porous particle 1 | 0.3 | 0.3 | 0.2 | 0.2 | 0.2 | 0.2 | 0.2 | 02 | 0.2 | 0.2 |
| Porous particle 2 | | | | 0.6 | | | | | | |
| Wax 1 | 3.5 | 3.3 | 4 | 3.5 | 3 | 2.3 | 2.6 | 0 | 3.5 | 1.5 |
| Wax 2 | | | | | | | | 3 | | |

All examples when properly applied and cured will show a scratch resistance using Red Scotch Brite of an 8 (1-10 scale, 10 being zero scratches)

Commercially available residential flooring obtained for comparison testing showed Red Scotch Brite scratch resistance of 2-3 rating.

TABLE 2

| Raw Material | Trade Name | Supplier |
|---|---|---|
| Mono-functional diluent 1 | Octyl/Decyl Acrylate | Sartomer |
| Mono-functional diluent 2 | N-vinyl-2-pyrrolidone | ISP |
| Mono-functional diluent 3 | Isobornyl acrylate | Sartomer |
| Di-functional diluent 1 | 1,6 Hexanediol diacrylate | Sartomer |
| Di-functional diluent 2 | Dipropylene glycol diacrylate | BASF |
| ≥3 Functional reactive diluent 1 | Genomer 3364 | Rahn |
| ≥3 Functional reactive diluent 2 | Dipentaerythritol Pentaacrylate | Sartomer |
| ≥3 Functional reactive diluent 3 | Ethoxylated Trimethyolpropane triacrylate | Cytec |
| Hexafunctional Oligomer 1 | Genomer 4622 | Rahn |
| Hexafunctional Oligomer 2 | CN975 | Sartomer |
| Di-functional Epoxy Oligomer 1 | CN120C80 | Sartomer |
| Di-functional Urethane Acrylate 1 | Desmolux XP 2614 | Bayer |
| Di-functional Urethane Acrylate 2 | CN971A80 | Sartomer |
| Di-funtional Urethane Acrylate 3 | Ebecryl 264 | Cytec |
| Flow Additive 1 | DC11 | Dow Chemical |
| Flow Additive 2 | Tego Rad 2650 | Evonik |
| Flow Additive 3 | Byk 320 | Byk Chemie |
| Anti-Settle Additive | Byk 410 | Byk Chemie |
| Photoinitiator 1 | Irgacure 184 | Ciba |
| Photoinitiator 2 | Irgacure 1173 | Ciba |
| Dispersing Additive 1 | Disperbyk 163 | Byk Chemie |
| Dispersing Additive 2 | Disperbyk 168 | Byk Chemie |
| Aluminum Oxide 1 | 800 | Treibacher/Microabrasives/Washington Mills |
| Aluminum Oxide 2 | 1000 | Treibacher/Microabrasives/Washington Mills |
| Aluminum Oxide 3 | 500 | Treibacher/Microabrasives/Washington Mills |
| Flatting Silica 1 | OK520 | Evonik |
| Flatting Silica 2 | OK412 | Evonik |
| Flatting Silica 3 | Rad 2105 | Grace Davison |
| Porous particle 1 | OGD201 | Cabot |
| Porous particle 2 | Nanobyk 3601 | Byk Chemie |
| Wax 1 | Perflu 727S | G.E. Chaplin, Inc. |
| Wax 2 | MP22XF | Micro powders |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A coating composition that is derived from ingredients comprising:
   a free radically polymerizable component comprising:
   a reactive diluent, wherein at least 15 weight percent of the reactive diluent is at least trifunctional with respect to radiation curable functionality based on the total weight of the reactive diluent;
   at least one resin comprising a first free radically polymerizable resin having a Tg of 50° C. or greater, wherein the at least one resin is at least trifunctional with respect to radiation curable functionality; and at least one kind of porous inorganic particle is dispersed in the free radically polymerizable component having a surface area of at least about 400 m$^2$/g and an oil absorption number of at least 400 g/100 g.

2. The coating composition of claim 1, further comprising at least one kind of additional, dispersed, inorganic particles, wherein the additional, dispersed, inorganic particles have an oil absorption number less than 400 g/100 g.

3. The coating composition of claim 2, wherein the at least one kind of additional, dispersed, inorganic particles have a D50 size in the range from about 0.05 micrometers to about 50 micrometers.

4. The coating composition of claim 1, wherein at least about 15 weight percent of the free radically polymerizable component is at least trifunctional with respect to radiation curable functionality based upon the total weight of the free radically polymerizable component.

5. The coating composition of claim 1, further comprising a second free radically polymerizable polyurethane resin.

6. The coating composition of claim 5, wherein the second resin has a Tg of less than about 50° C.

7. The coating composition of claim 1, further at least one kind of dispersed organic wax particle.

8. A coating composition that is derived from ingredients comprising:

a radiation curable component;

at least one kind of dispersed, porous inorganic particle having a surface area in the range from about 400 m$^2$/g to about 1000 m$^2$/g and an oil absorption number of at least 400 g/100 g; and at least one kind of dispersed, organic wax particle.

9. The coating composition of claim 8, wherein at least 15% by weight of the radiation curable component is at least trifunctional with respect to radiation curable functionality based upon the total weight of the radiation curable component.

10. The coating composition of claim 8, further comprising at least one kind of additional, dispersed, inorganic particles, wherein the additional, dispersed, inorganic particles have an oil absorption number less than 400 g/100 g and have a D$_{50}$ size in the range from about 0.05 micrometers to about 50 micrometers.

* * * * *